(12) United States Patent
Inoue et al.

(10) Patent No.: US 8,376,553 B2
(45) Date of Patent: Feb. 19, 2013

(54) IMAGE DISPLAY APPARATUS HAVING STOP SHAPE CONTROL

(75) Inventors: Chiaki Inoue, Utsunomiya (JP); Koshi Hatakeyama, Tokyo (JP)

(73) Assignee: Canon Kabushiki Kaisha (JP)

( * ) Notice: Subject to any disclaimer, the term of this patent is extended or adjusted under 35 U.S.C. 154(b) by 99 days.

(21) Appl. No.: 12/835,437

(22) Filed: Jul. 13, 2010

(65) Prior Publication Data

US 2010/0277700 A1 Nov. 4, 2010

Related U.S. Application Data

(63) Continuation of application No. 11/859,409, filed on Sep. 21, 2007, now Pat. No. 7,878,663.

(30) Foreign Application Priority Data

Oct. 3, 2006 (JP) ................................. 2006-271351

(51) Int. Cl.
  *G03B 21/20* (2006.01)
(52) U.S. Cl. ........................................................ 353/85
(58) Field of Classification Search .................... 353/94, 353/97, 84, 85; 359/729; 362/555, 249.02, 362/235, 249.06; 345/39
  See application file for complete search history.

(56) References Cited

U.S. PATENT DOCUMENTS

| 6,330,039 | B2 | 12/2001 | Matsui et al. |
| 6,935,749 | B2 | 8/2005 | Kato |
| 6,989,939 | B2 | 1/2006 | Yamasaki et al. |
| 7,016,124 | B2 | 3/2006 | Hatakeyama et al. |
| 7,230,657 | B2 | 6/2007 | Childers et al. |
| 7,427,146 | B2 | 9/2008 | Conner |
| 7,670,008 | B2 | 3/2010 | Kuwa |
| 7,789,517 | B2 | 9/2010 | Lee |
| 2004/0114250 | A1 | 6/2004 | Kato |
| 2005/0122481 | A1 | 6/2005 | Yamasaki et al. |
| 2005/0174775 | A1 | 8/2005 | Conner |
| 2006/0146297 | A1 | 7/2006 | Lee |
| 2007/0263179 | A1* | 11/2007 | Katsuragawa et al. ......... 353/97 |

FOREIGN PATENT DOCUMENTS

| JP | 2001-185760 A | 7/2001 |
| JP | 2001-281760 A | 10/2001 |
| JP | 2003-234513 A | 8/2003 |
| JP | 2004-151657 A | 5/2004 |
| JP | 2004-184641 A | 7/2004 |
| JP | 2004-286858 A | 10/2004 |
| JP | 2005-024695 A | 1/2005 |
| JP | 2005-106948 A | 4/2005 |
| JP | 2005-156650 A | 6/2005 |
| JP | 2006-189825 A | 7/2006 |
| JP | 2006-330154 A | 12/2006 |
| JP | 2007-524975 A | 8/2007 |
| WO | 2005/083472 A1 | 9/2005 |

* cited by examiner

*Primary Examiner* — Thanh Luu
*Assistant Examiner* — Danell L Owens
(74) *Attorney, Agent, or Firm* — Rossi, Kimms & McDowell LLP

(57) ABSTRACT

Provided is an image display apparatus, including: a light modulation element; an illumination optical system which includes at least one light source unit including a plurality of light emitting units two-dimensionally arranged and illuminates the light modulation element; and a projection optical system for enlarging and projecting an image of the light modulation element onto a projection surface, in which: an image of the plurality of light emitting units is imaged at a position corresponding to a stop of the projection optical system; the stop has an aperture shape of rotational asymmetry or of two-fold symmetry; and the plurality of light emitting units have illuminance intensities each independently controlled.

9 Claims, 8 Drawing Sheets

○ LIGHTING
● EXTINCTION

○ LIGHTING
● EXTINCTION

IMAGE DISPLAY APPARATUS HAVING STOP SHAPE CONTROL

CROSS REFERENCE RELATED TO APPLICATION

This is a continuation of and claims priority from U.S. patent application Ser. No. 11/859,409 filed Sep. 21, 2007, the content of which is incorporated herein by reference.

BACKGROUND OF THE INVENTION

1. Field of the Invention

The present invention relates to an image display apparatus such as a front projector or a rear projector.

2. Description of the Related Art

In general, an image display apparatus employs a liquid crystal display panel or a micro mirror array device as a light modulation element and controls transmission and shielding of light or polarization, such that a selected optical pattern is projected by a projection optical system, to thereby display an image on a projection surface.

Examples of an illumination device conventionally used for the image display apparatus include a high-intensity discharge lamp such as an extra high pressure mercury lamp, a metal halide lamp, or a xenon lamp, and the image display apparatus typically includes a paraboloidal surface reflector which collimates illumination light beams from the above-mentioned light sources. However, when the high-intensity discharge lamp is used, there arise problems that it is necessary to provide a cooling system for dealing with heat generated by the high-intensity discharge lamp, which increases a size of the illumination device, and the high-intensity discharge lamp has a short life of several thousand hours.

In view of the above, a light source using a semiconductor is drawing attention in recent years as a new light source. Particularly, there has been made such a significant improvement on a light emitting diode (LED) that a product having intensity and efficiency high enough to be used as lighting is being developed. For example, Japanese Patent Application Laid-open No. 2001-185760 discloses a reflective LED package in which a concave reflecting surface 2 is provided behind an LED 1. Also, Japanese Patent Application Laid-open No. 2003-234513 discloses a cannonball-type LED package obtained by molding an LED 3 with a synthetic resin material 4 in a lens shape. The LED has advantages over the above-mentioned high-intensity discharge lamp in terms of size reduction, weight reduction, low-power consumption, extended life, and quick response when turned on.

However, it is difficult at present to attain sufficient luminance on a screen in an image display apparatus having an LED as a light source. This is because the LED is still inferior to the extra high pressure mercury lamp in terms of efficiency, and only a small amount of light can be obtained from one LED even with a current maximum to the rating. For this reason, there has been a method of arranging a plurality of LEDs on a plane in an array in order to increase light amount. For example, Japanese Patent Application Laid-open No. 2001-281760 discloses a display device in which a plurality of solid-state light emitting elements are arranged in a matrix, and an integrator illumination is adopted to superimpose light beams from the plurality of solid-state light emitting elements on a light modulation element, to thereby increase luminance. Also, for example, Japanese Patent Application Laid-open No. 2004-286858 discloses a lighting device in which a plurality of solid-state light emitting elements are two-dimensionally arranged and light emitting surfaces of the solid-state light emitting elements are arranged such that the light emitting surfaces are in conjugate relation with a light modulation element, so an enlarged image in the light emitting surfaces is superimposed on the light modulation element, to thereby attain uniform and high-intensity lighting.

Also, in the conventional image display apparatus, as disclosed in U.S. Pat. No. 6,989,939, an aperture stop is disposed in a secondary light source plane in proximity to an integrator lens such as a fly eye lens in an illumination optical system so as to restrict light beams reaching a projection surface which is a conjugate surface with the aperture stop. With this structure, a situation is prevented in which unnecessary light from a light modulation element is subjected to total reflection in a prism system such as a polarization beam splitter to form a ghost on the projection surface.

Also, U.S. Pat. No. 7,016,124 discloses a system as illustrated in FIG. 23 in which an aperture stop 5 has a shape corresponding to a shape of each cell 6 constituting an integrator lens, and further, the aperture stop 5 is made variable in size. With this structure, an illuminance distribution on a projection surface is made uniform and brightness and contrast of an image can be adjusted.

As regards a projection optical system used for an image display apparatus such as a front projector or a rear projector, there has been conventionally well known a projection optical system as disclosed in U.S. Pat. No. 6,989,939 which uses a wide-angle lens of a coaxial optical system in which an optical axis connecting a center of an object plane and a center of an image plane is not bent.

However, in recent years, there has been proposed a projection optical system as disclosed in U.S. Pat. No. 7,016,124 which is called an off-axial optical system, in which an optical axis is bent and the constituent planes are non-coaxial. In the off-axial optical system, a keystone distortion occurring when an image is obliquely projected can be corrected and the projection range can be easily increased as compared with a coaxial optical system. U.S. Pat. No. 7,016,124 describes in detail characteristics and advantages of the off-axial optical system.

The off-axial optical system using a reflecting surface has many advantageous characteristics in comparison with the conventional coaxial optical system, but the off-axial optical system is often extremely sensitive to product deviations such as surface accuracy or decentering, which leads to a problem in mass production. For example, when an asymmetric deviation is generated in a plane shape, an image plane goes out of focus in two directions orthogonal to each other across the entire image plane, that is, an astigmatic difference is generated, which is hard to eliminate by mechanically adjusting the system.

To deal with the above-mentioned problem, U.S. Pat. No. 7,016,124 discloses a structure in which a pupil of the off-axial optical system is made asymmetric in an off-axial cross section and a cross section orthogonal to the off-axial cross section. In other words, to use the off-axial optical system using a reflecting surface, as a projection optical system of an image display apparatus, an illumination optical system is indispensable for attaining the pupil shape without reducing illumination efficiency in the entire image display apparatus.

However, in the image display apparatus which uses a conventional combination of a high-intensity discharge lamp and a reflector as a light source, a projection optical system having a rotationally symmetric stop shape is generally adopted because an aperture of the reflector is substantially circular. Alternatively, the image display apparatus may adopt a method in which a cylindrical lens is provided in the illumination optical system to compress illumination light beams in a desired direction, to thereby form the stop of the projection optical system into an asymmetric shape.

An optical system conserves a product of an area of the light source and a divergence solid angle of the light beams (conserves etendue), so there is a limit in controlling a stop shape of the projection optical system. In order to lift the limit, the light source itself may be formed into a rotationally asymmetric shape. In order to form the light source into a rotationally asymmetric shape, it is necessary to arrange small solid-state light emitting elements in an array so as to form a shape corresponding to a desired stop shape of the projection optical system.

According to Japanese Patent Application Laid-open Nos. 2001-281760 and 2004-286858, solid-state light emitting elements are arranged in an array mainly for the purpose of improving luminance and reducing unevenness in luminance on the light modulation element. There is no description on the relation between the light source and the pupil or the stop of the projection optical system and it is not intended to attain an effect of controlling the stop shape of the projection optical system. Therefore, the inventions disclosed in Japanese Patent Application Laid-open Nos. 2001-281760 and 2004-286858 are different from the present invention in effect.

Further, U.S. Pat. Nos. 6,989,939 and 7,016,124 disclose a structure in which an aperture stop is disposed in proximity to the integrator lens, to thereby restrict light beams. However, this structure reduces illumination efficiency and increases unevenness in illuminance on the projection surface because cells constituting the integrator lens are partially light-shielded only on the periphery.

SUMMARY OF THE INVENTION

The present invention has been made to solve the above-mentioned problems, and it is an object of the invention to provide an image display apparatus capable of attaining high contrast by controlling illuminance on a projection surface and a stop shape of a projection optical system.

In order to achieve the above-mentioned object, according to an aspect of the present invention, an image display apparatus includes: a light modulation element; an illumination optical system which includes at least one light source unit including a plurality of light emitting units two-dimensionally arranged and illuminates the light modulation element; and a projection optical system for enlarging and projecting an image in the light modulation element on a projection surface, in which: the plurality of light emitting units have an image to be imaged at a position corresponding to a stop of the projection optical system; the stop has an aperture shape of rotational asymmetry or of two-fold symmetry; and the plurality of light emitting units have illuminance intensities each independently controlled.

According to another aspect of the present invention, an image display apparatus includes: an image signal input unit; a light modulation element; a control unit for controlling the light modulation element; a projection optical system for enlarging and projecting an image of the light modulation element on a projection surface; and an illumination optical system for illuminating the light modulation element, in which: the illumination optical system includes at least one light source unit including a plurality of light emitting units two-dimensionally arranged; an image of the light emitting units is imaged at a position corresponding to a stop of the projection optical system; the stop has an aperture shape of rotational asymmetry or of two-fold symmetry; and the control unit controls the light modulation element according to an image input signal and arbitrarily controls each of illuminance intensities of the plurality of light emitting units.

Further features of the present invention will become apparent from the following description of exemplary embodiments with reference to the attached drawings.

DESCRIPTION OF THE EMBODIMENTS

The present invention is described in detail with reference to embodiments illustrated in FIGS. 1, 2, 3, 4, 5, 6, 7, 8, 9, 10, 11, 12, 13, 14, 15, 16, 17, 18, 19 and 20.

First Embodiment

Figure 1:
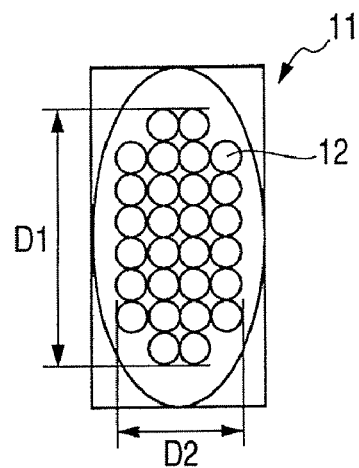
FIG. 1 is a front view of a light source unit according to a first Embodiment.

FIG. 1 is a front view of a light source unit. The light source unit 11 includes a plurality of LED light sources 12 as light emitting units, which are solid-state light emitting elements arranged in a substantially elliptical shape. The LED light sources is a light source which basically emits light used for displaying (projecting) image information and is not a light source used for displaying a signal except an image signal. The LED light source in this embodiment does not include light sources such as a light source only for emitting light indicating a status of being powered on, a light source only for emitting light indicating display mode, and a light source only for emitting light to detect the presence of a person. The LED light sources 12 are arranged in groups each including a plurality of the LED light sources 12 in a longitudinal direction and in a lateral direction, that is, the LED light sources 12 are two-dimensionally arranged. Specifically, the LED light sources 12 are arranged such that eight rows thereof are arranged in a first direction corresponding to the longitudinal direction and four columns thereof are arranged in a second direction corresponding to the lateral direction. More particularly, to arrange the LED light sources 12 in a substantially elliptical shape, the LED light sources 12 may be first arranged in a rectangular shape having eight rows thereof in the longitudinal direction and four columns thereof in the lateral direction and the LED light sources 12 provided on four corners of the rectangle may be removed.

Figure 2:
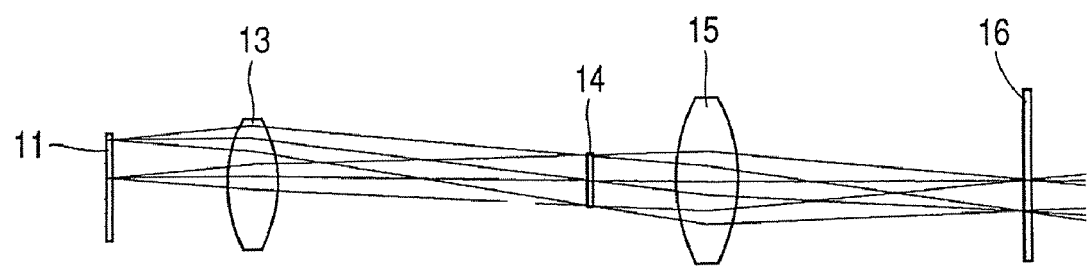
FIG. 2 is a cross-sectional view taken along a plane including an optical axis of an illumination optical system in a longitudinal direction.
Figure 3:
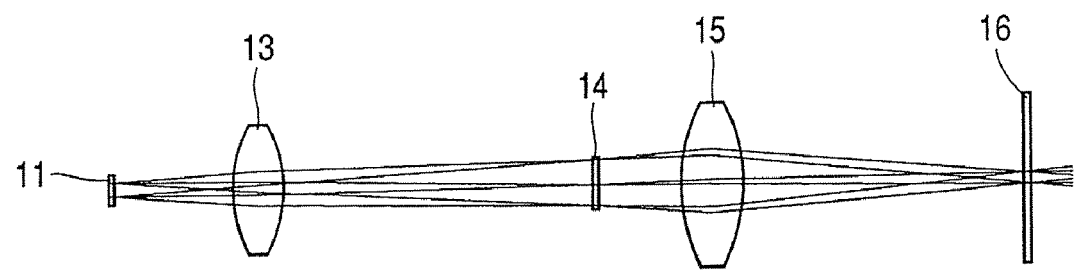
FIG. 3 is a cross-sectional view taken along a plane which includes the optical axis of the illumination system and is orthogonal to the plane of FIG. 2.

FIG. 2 is a cross-sectional view taken along a plane including an optical axis of an illumination optical system and a longitudinal direction and FIG. 3 is a cross-sectional view taken along a plane which includes the optical axis of the illumination system and is orthogonal to the plane of FIG. 2. Arranged in front of the light source unit 11 are a light modulation element 14, an illumination optical system 13 for illuminating the light modulation element 14 with a light beam from the light source unit 11, and a projection optical system 15 for projecting a light beam from the light modulation element 14 on a projection surface. The projection optical system 15 is an off-axial projection optical system having a plurality of reflecting surfaces of rotational asymmetry. In the projection optical system, a stop surface 16 which has an aperture having a different aspect ratio is provided as a stop member.

The off-axial projection optical system may include two or more reflecting surfaces (free-form curved surfaces) of rotational asymmetry, and may preferably include four or more surfaces. The plurality of rotationally asymmetric reflecting surfaces may be integrally supported by a support structure (not illustrated), and the support structure may be held by a casing of an image display apparatus.

Light beams emitted from the plurality of LED light sources 12 pass through the projection optical system 15 to form an image of the stop surface 16 of the projection optical system 15. A light source image may be formed at any position as long as the position is located at one third or less, one eighth or less, or more preferably, one tenth or less of a focal length of the projection optical system 15 from the stop position (in a case of a magnification optical system, a focal length of wide-angle ends). The light modulation element 14 is illuminated substantially uniformly by a condenser lens which is a constituent element of the illumination optical system 13. An image formed by the light modulation element 14 is enlarged and projected on the projection surface by the projection optical system 15 through the stop surface 16.

Figure 4:
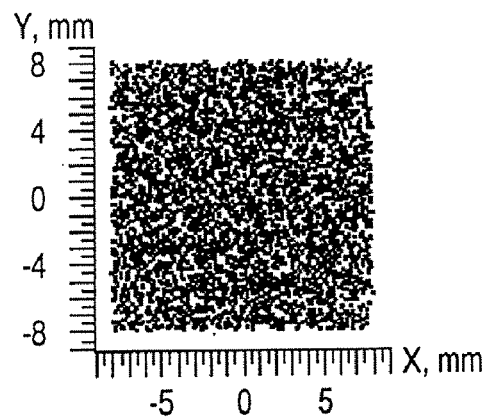
FIG. 4 is an illuminance distribution chart on a light modulation element.

FIG. 4 illustrates an illuminance distribution on the light modulation element 14. As understood from FIG. 4, light beams generated from the LED light sources 12 of the light source unit 11 are superimposed on the light modulation element 14 by the illumination optical system 13, which eliminates variations in luminance of the LED light sources 12, to thereby uniformly illuminate the light modulation element 14.

Figure 5:
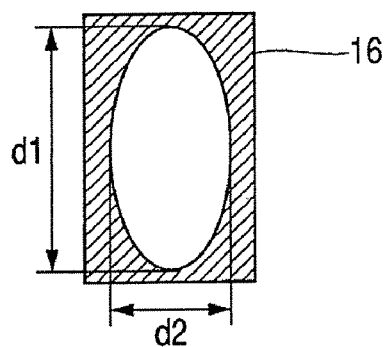
FIG. 5 is a front view of a stop surface.

FIG. 5 illustrates a stop shape of the stop surface 16. The stop aperture shape is in similarity relationship with an outer shape of a light emitting area of the light source unit 11 of FIG. 1. In this case, the direction along which a largest width of the light emitting area of the light source unit 11 extends is set as a first direction. And a direction orthogonal to the first direction is set as a second direction. The width in the first direction of the light emitting area is defined as D1 and the width in the second direction of the light emitting area is defined as D2. The ratio between the width D1 and the width D2 may be derived by regarding that the width D1 corresponds to a width in a first direction of the light source image of the light source unit 11 and the width D2 corresponds to a width in a second direction of the light source image of the light source unit 11, the light source image being formed in the projection optical system 15. In the stop position, a width of the stop aperture portion in a direction corresponding to the first direction of the light emitting area is defined as d1 and a width of the stop aperture portion in a direction orthogonal to the first direction is defined as d2.

At this time, the following conditional expression may be satisfied.

$$d1/d2 \times 0.8 < D1/D2 < d1/d2 \times 1.2 \qquad (1)$$

Further, the following conditional expression may also be satisfied.

$$d1/d2 \times 0.9 < D1/D2 < d1/d2 \times 1.1 \qquad (1a)$$

The above-mentioned similarity relationship satisfies those conditional expressions. In this embodiment, D1/D2=2.

Figure 6:
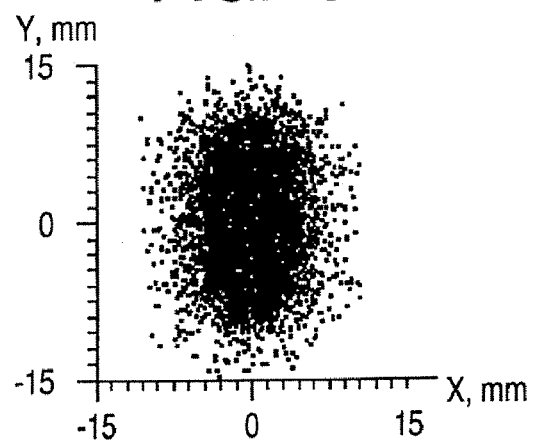
FIG. 6 is a diagram illustrating an illuminance distribution of light entering the stop surface.

FIG. 6 illustrates an illuminance distribution of light beams incident on the stop surface 16. The illuminance distribution on the stop surface 16 is also in similarity relationship with the outer shape of the light emitting area of the light source unit 11. The stop provided in the similarity relationship with the light source unit 11 as described above allows the stop surface 16 to shield light such as a flare or high-order diffracted light which is supposed to be unnecessary. More specifically, the magnification of a light source image formed by the optical system between the LED light sources 12 and the stop surface 16 may be taken into consideration.

In other words, the following conditional expressions may be satisfied, $$0.9 \times M \times D1 < d1 < 1.3 \times M \times D1 \qquad (2),$$

$$0.9 \times M \times D2 < d2 < 1.3 \times M \times D2 \qquad (3),$$

where M represents the magnification of the light source image. Further, the following conditional expressions may be satisfied.

$$1.0 \times M \times D1 < d1 < 1.2 \times M \times D1 \qquad (2a)$$

$$1.0 \times M \times D2 < d2 < 1.2 \times M \times D2 \qquad (3a)$$

In this case, as illustrated by the conditional expressions (2a) and (3a), if d1 is smaller than 1.0×M×D1, light is partially cut to produce a darker image. However, in order to increase contrast even by trading off the brightness to some degree, the value 1.0 in 1.0×M×D1 of the conditional expressions (2a) and (3a) may be reduced to be lower than 1.0 in order to shield light which reduces the contrast. Also, in this case, as illustrated by the numeric ranges of the conditional expressions (1) and (1a), the aspect ratio of the light emitting area and the aspect ratio of the aperture portion of the stop surface may be different from each other. In the following, the difference between the aspect ratio of the light emitting area and the aspect ratio of the aperture portion of the stop surface is not particularly described. However, in the following embodiment, those ratios may be different from each other within the ranges illustrated by the conditional expressions (1) and (1a).

Also, in the above-mentioned off-axial optical system, the aspect ratio of the aperture portion of the stop surface 16, that is, the ratio between the width in the first direction and the width in the second direction, may be made large to some extent. Along with this, the aspect ratio of the light emitting area of the LED light sources 12, that is, the ratio between the number of the LED light sources 12 in the longitudinal row and the number of the LED light sources 12 in the lateral column, may also be made large to some extent. In other words, the following conditional expressions may be satisfied.

$$1.1 < D1/D2 < 10.0 \quad (4)$$

$$1.1 < d1/d2 < 10.0 \quad (5)$$

Also, the following conditional expressions may be satisfied.

$$1.2 < D1/D2 < 5.0 \quad (4a)$$

$$1.2 < d1/d2 < 5.0 \quad (5a)$$

Further, the following conditional expressions may also be satisfied.

$$1.5 < D1/D2 \quad (4b)$$

$$1.5 < d1/d2 \quad (5b)$$

In this embodiment, the LED light sources 12 are arranged in an array of 4×8. However, the number of the LED light sources 12 is not limited thereto, and may be increased or decreased depending on the necessary luminance. The illumination optical system 13 and the projection optical system 15 may naturally employ a plurality of lenses, and may also include lenses forming the projection optical system 15 on the projection surface side with respect to the stop surface 16.

Further, the light modulation unit 14 illustrated in FIGS. 2 and 3 is described as a single-panel transmissive liquid crystal display element, but the light modulation unit 14 is not limited thereto. For example, a plurality of LED light sources for emitting light in multiple different colors may be employed and a plurality of the light modulation elements 14 corresponding to the respective LED light sources may also be employed. For example, LED light sources each emitting red light, green light, and blue light, respectively, and transmissive or reflective liquid crystal display elements corresponding to the respective LED light sources may be employed to form the image display apparatus. In a case where a white LED light source is employed, the image display apparatus may be provided with a color separating function and a color combining function, so a plurality of light modulation elements 14 corresponding to the colors can be employed. As the light modulation element 14, a reflective liquid crystal element or a DMD may also be employed.

With the above-mentioned structure, in the image display apparatus provided with an aperture having an ellipsoidal stop shape different in aspect ratio, which is suitably applied to an off-axial projection optical system, it is possible to attain lighting high in illumination efficiency with a simple structure.

Figure 7:
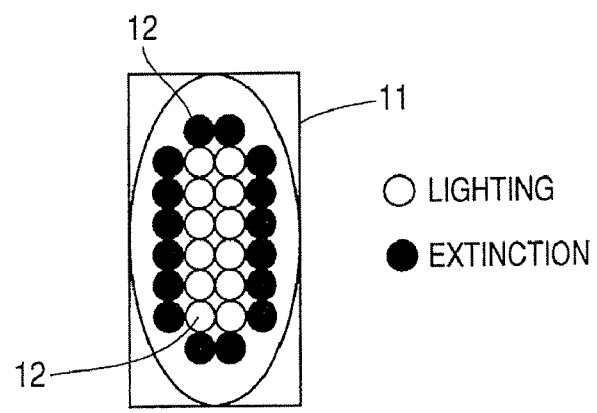
FIG. 7 is a diagram illustrating a light source unit in which LED light sources on the periphery are turned off.
Figure 8:
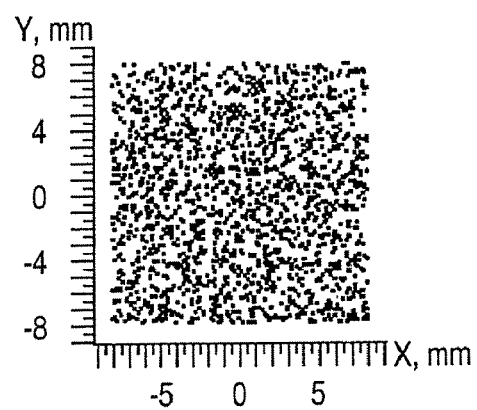
FIG. 8 is an illuminance distribution chart on the light modulation element.

The illuminance intensities of the LED light sources 12 in the light source unit 11 can be independently controlled. FIG. 7 illustrates a case where the LED light sources 12 in the center are turned on and the LED light sources 12 on the periphery are turned off. FIG. 8 illustrates an illuminance distribution chart on the light modulation element 14 when the LED light sources 12 on the periphery are turned off. The illuminance is uniformly reduced as compared with the state of FIG. 4 where all the LED light sources 12 are turned on, because the number of LED light sources 12 that are turned on in the light source unit 11 is reduced.

Figure 9:
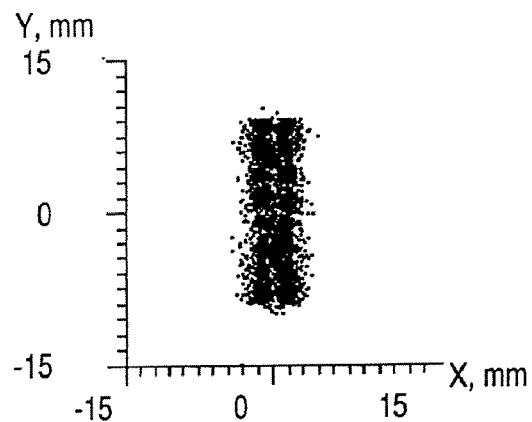
FIG. 9 is an illuminance distribution chart on the stop surface.

Further, FIG. 9 illustrates an illuminance distribution chart on a pupil, that is, the stop surface 16 in the above-mentioned case. The light source unit 11 and the stop surface 16 are in conjugate relation with each other, and therefore the distribution shape of the illuminance distribution on the stop surface 16 is similar to the outer shape of the lighted portion of FIG. 7.

In this case, the value of D1/D2 in the case where all the LED light sources 12 are turned on is different from that in the case where the LED light sources 12 on the periphery are turned off. The value of D1/D2 in the case of brightness priority where all the LED light sources 12 are turned on may set be smaller than that in the case of contrast priority where the LED light sources 12 on the periphery are turned off. Here, D1/D2 in the case of contrast priority can be equal to or more than 1.2 (or preferably 1.5) times D1/D2 in the case of brightness priority.

The luminance of the LED light source 12 is defined by a binary state of either a turned-on state or a turned-off state. However, the light emitting luminance of the LED light source 12 may be adjusted to produce an electrically continuous gradation, to thereby form an arbitrary illuminance distribution. A gradation sequence may also be expressed by pulses by taking advantage of high response speed of the LED light source 12.

As described above, the luminance of each of the LED light sources 12 are arbitrarily adjusted, to thereby obtain uniform illuminance on the light modulation element 14 despite the non-uniform luminance in the light source unit 11. At the same time, the illuminance distribution or the pupil transmission distribution on the stop surface 16 can be controlled so as to correspond to the luminance distribution in the light source unit 11.

Figure 10:
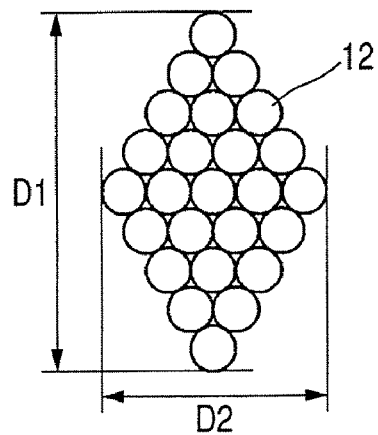
FIG. 10 is a front view of a light source unit according to a modification example 1.
Figure 11:
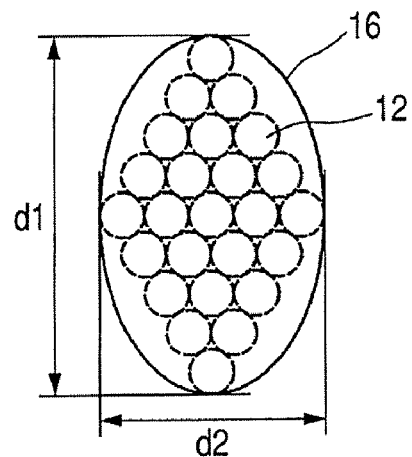
FIG. 11 is a diagram illustrating a stop shape and an image of the light source unit according to the modification example 1.
Figure 12:
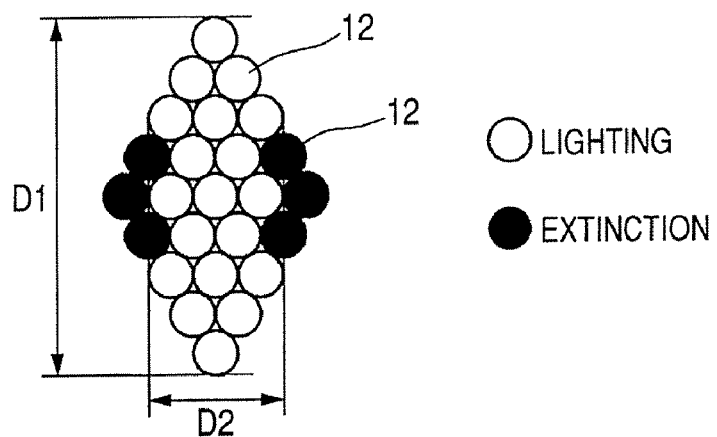
FIG. 12 is a front view of the light source unit according to the modification example 1 in which LED light sources on the periphery are turned off.

FIG. 10 illustrates an arrangement (D1, D2) of the LED light sources 12 of a modification example 1, FIG. 11 illustrates a shape (d1, d2) formed by the LED light sources 12 on the stop surface 16, and FIG. 12 illustrates a case where the LED light sources 12 are partially turned off.

Figure 13:
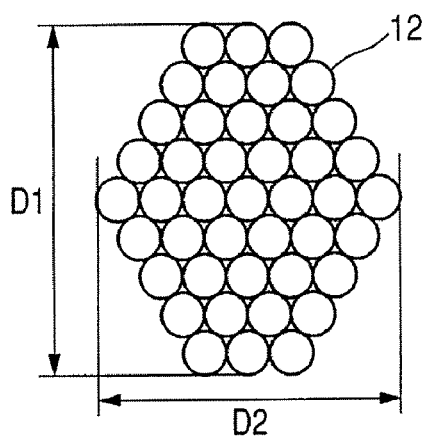
FIG. 13 is a front diagram of a light source unit according to a modification example 2.
Figure 14:
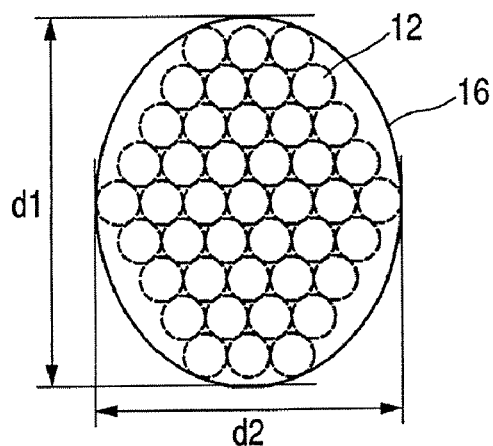
FIG. 14 is a diagram illustrating a stop shape and an image of the light source unit according to the modification example 2.
Figure 15:
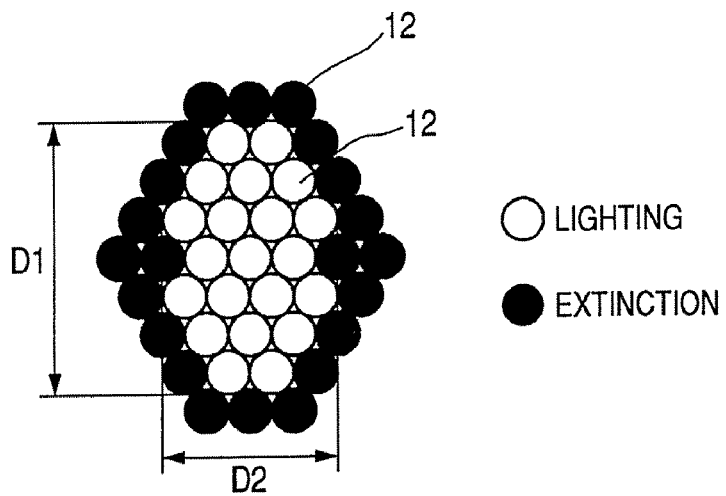
FIG. 15 is a front view of the light source unit according to the modification example 2 in which LED light sources on the periphery are turned off.

Also, FIG. 13 illustrates an arrangement (D1, D2) of the LED light sources 12 of a modification example 2, FIG. 14 illustrates a shape (d1, d2) formed by the LED light sources 12 on the stop surface 16, and FIG. 15 illustrates a case where the LED light sources 12 are partially turned off.

The LED light sources 12 may also be arranged as described above. Even in those cases, the value of D1/D2 in the case where all the LED light sources 12 are turned on is different from that in the case where the LED light sources 12 are partially turned off.

Second Embodiment

Figure 16:
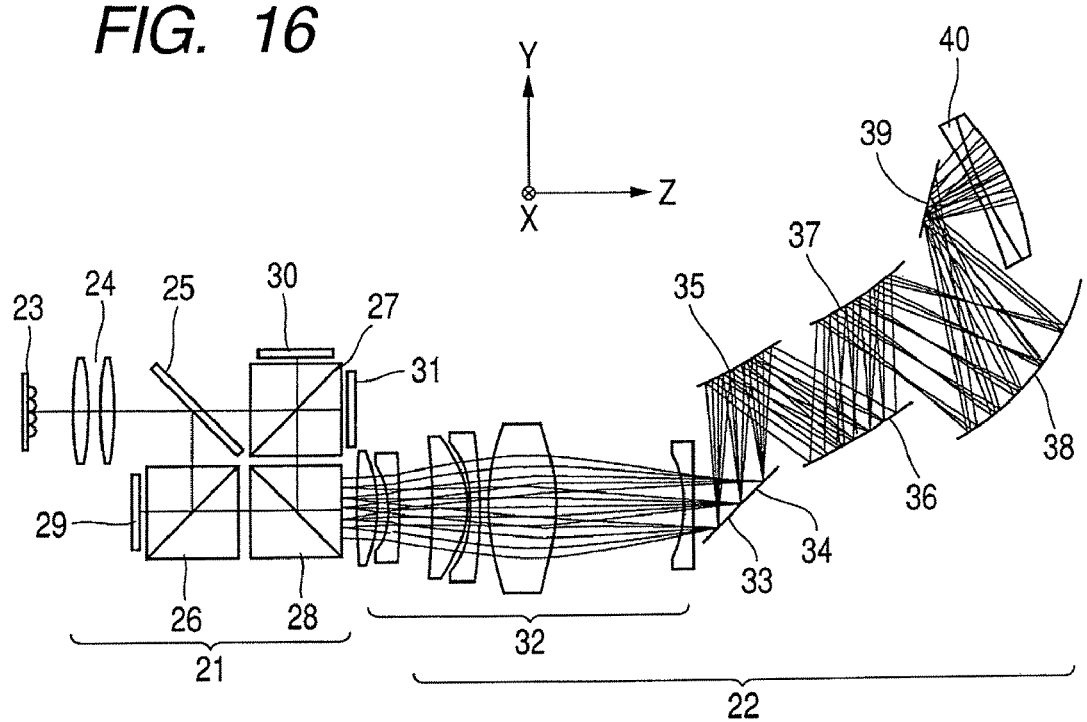
FIG. 16 is a structural diagram of an optical system according to a second Embodiment.

FIG. 16 illustrates a structural diagram of a projector (image display apparatus) according to a second Embodiment, which is roughly divided into an illumination unit 21 and a projection optical system 22 formed of an off-axial optical system. The illumination unit 21 includes a light source unit 23, an illumination optical system 24, and a color separating optical system. The color separating optical system includes a dichroic mirror 25 and three polarization beam splitters (PBS) 26, 27, and 28, and illuminates a light modulation element which includes three reflective liquid crystal panels of 3RGB (including a light modulation element and an image forming element) 29, 30, and 31.

The projection optical system 22 has zoom lenses 32 for receiving light emitted from the illumination unit 21, a stop surface 33, and a plurality of rotationally asymmetric reflecting surfaces 35 to 38 (two or more surfaces, not limited to four) each having a curved reflecting surface. The projection optical system 22 further includes, in addition to the above, a fold mirror 34, a fold mirror 39, and a lens 40. In the projection optical system 22, the fold mirror 34 functions as a stop. In this case, the projection optical system 22 can have an optical path (optical path of reference axis light beam) of an image light beam emitted from the three reflective liquid crystal panels 29, 30, and 31, bent within a paper plane (YZ plane, a first plane). A light source image formed within the plane (YZ plane, a first plane) in which the optical path is bent may be smaller in width (stop diameter, width of an aperture portion of the stop) than a light source image formed within a plane (XZ plane, a second plane) orthogonal to the plane (YZ plane, a first plane).

Figure 17:
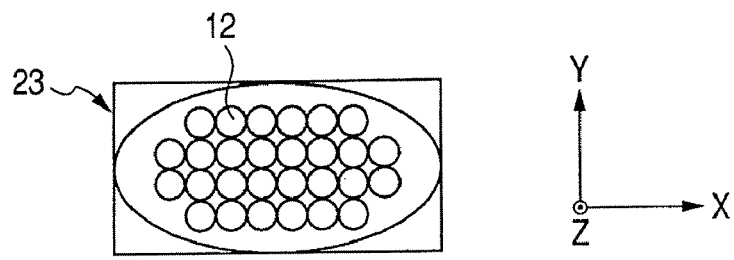
FIG. 17 is a structural diagram of a light source unit.

As illustrated in FIG. 17, the light source unit 23 has a structure similar to that of the light source unit 20 of FIGS. 1 and 7, but another light source unit may also be employed.

The stop surface 33 does not have the aperture portion described in the above-mentioned embodiments, and forms a member for exclusively guiding only light entering a certain area to an optical system of a subsequent stage, or the rotationally asymmetric reflecting surface 35 in this case. The certain area described in this embodiment corresponds to the aperture (portion) of the above-mentioned embodiments. Alternatively, this embodiment also includes a structure in which the fold mirror 34 has a shape which serves as a stop surface which has an aperture with a width d1 in a longitudinal direction and a width d2 in a lateral direction and is provided to the stop position. Naturally, it is also possible to provide a stop having an aperture between the zoom lenses 32 and the fold mirror 34 or between the fold mirror 34 and the rotationally asymmetric reflecting surface 35.

In the projection optical system 22, the zoom lenses 32 may not be of variable power, and the lens 40 may include a refractive optical system including a plurality of lenses and a refractive optical element. The projection optical system 22 of this embodiment may also be formed only of a mirror, or may be formed only of a lens and a refractive optical element.

In this embodiment, the reference axis light beam of a principal ray of light beam passing through the centers of the reflective liquid crystal panels 29, 30, and 31 to be emitted vertically from the centers or emitted from the centers is bent in a paper plane along the reflecting surfaces 35 to 38, and the reference axis light beam is projected obliquely on the projection surface. Accordingly, an emitting pupil of the zoom lenses 32, that is, the stop surface 33 has a compressed shape which is smaller in width in an Y direction which is a direction of the stop diameter on the paper plane than in X direction which is a vertical direction with respect to the paper plane.

Figure 18:
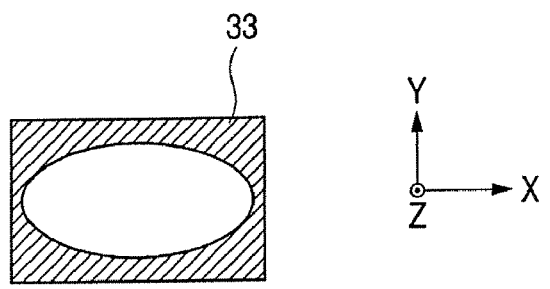
FIG. 18 is a front view of a stop surface.

Accordingly, the aperture shape of the stop surface 33 has an ellipsoidal shape compressed in the Y direction as illustrated in FIG. 18. Correspondingly, the light source unit 23 has a shape which is in similarity relationship with the aperture shape of the stop surface 33, and is provided so as to have an ellipsoidal outer shape compressed in the Y direction, which is preferable in terms of aberration correction and size reduction.

As described above, the light source unit 23 and the stop surface 33 of the projection optical system 22 are arranged so as to be in conjugate relation with each other, which enables the illuminance distribution on the stop surface 33, that is, on the pupil surface to be controlled by varying the arrangement of the LED light sources 12 in the light source unit 23. Accordingly, it is possible to realize a highly efficient asymmetric pupil shape with a structure of the illumination unit 21 which is simpler than a conventional structure.

In the second Embodiment, the illuminance distribution on the stop surface 33 of the projection optical system 22 is in similarity relationship with an outer shape of the light source unit 23, but it is also possible to use a cylindrical lens or the like to compress light beam in an arbitrary direction, to thereby adjust the stop surface 33 to have a desired stop shape.

Figure 19:
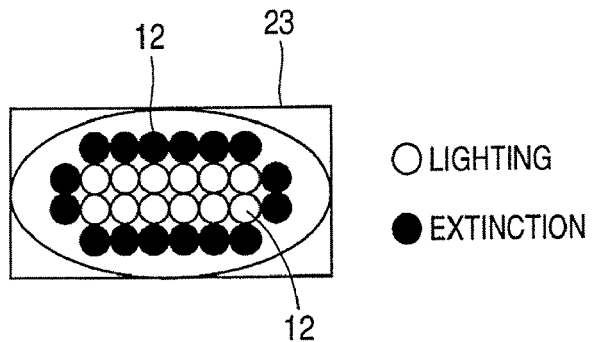
FIG. 19 is a diagram illustrating luminance modulation in a light source.

Further, as illustrated in FIG. 19, the luminance of each of the LED light sources 12 in the light source unit 23 is arbitrarily adjusted, to thereby obtain uniform illuminance on the reflective liquid crystal panels 29, 30, and 31 despite the non-uniform luminance in the light source unit 23. With this structure, the illuminance distribution, that is, the pupil transmission distribution can be controlled on the stop surface 33 in accordance with the luminance distribution in the light source unit 23.

Furthermore, in the second Embodiment, the illuminance distribution, that is, the pupil transmission distribution on the stop surface 33 of the projection optical system 22 can also be controlled simultaneously, which enables the luminance of the light unit 23 to be increased to the center thereof in order to increase the transmission of the pupil to the center thereof when displaying a dark image similarly to the above. In other words, in the projection optical system 22, the light beam closer to the light axis form an image on the projection surface, which means that aberrations can be suppressed, to thereby display an image higher in imaging contrast.

Figure 20:
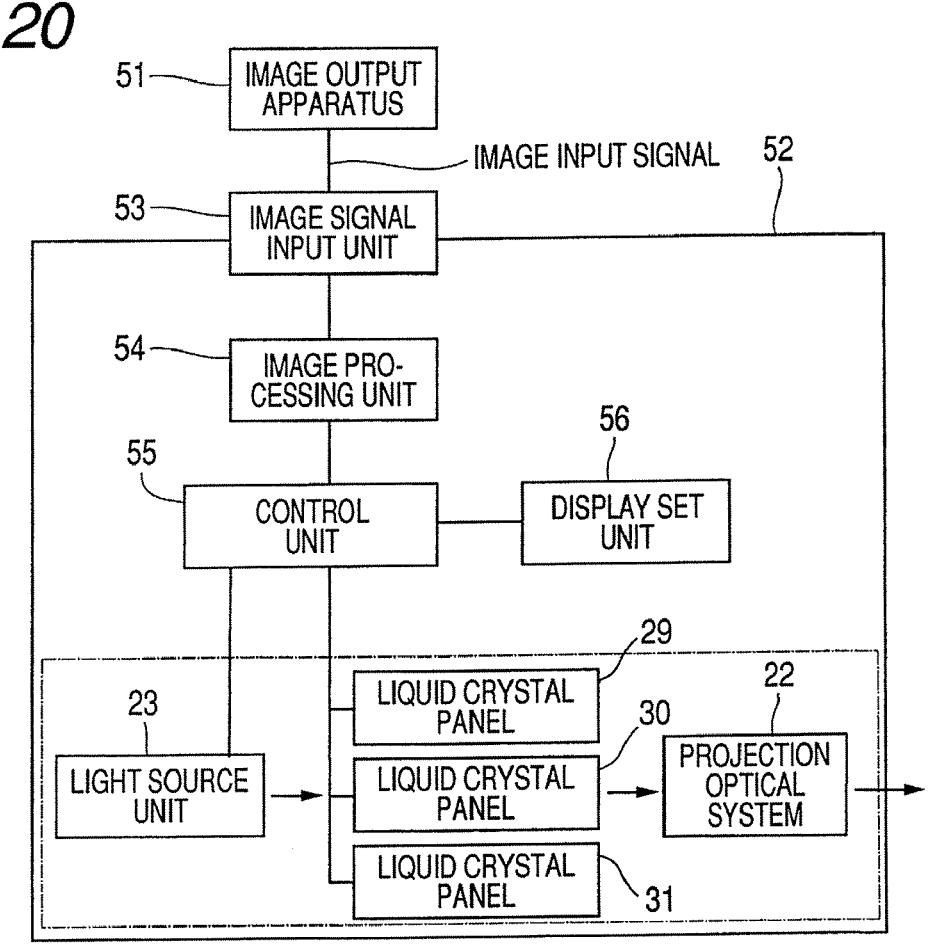
FIG. 20 is a structural diagram of a block circuit for performing luminance modulation.
Figure 21:
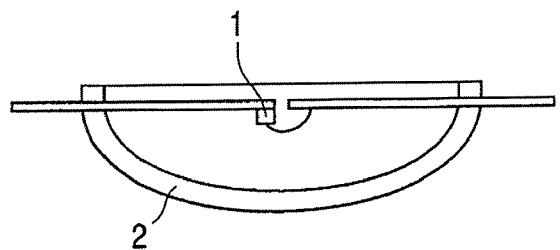
FIG. 21 is a structural diagram of a reflector-type LED package according to a conventional example.
Figure 22:
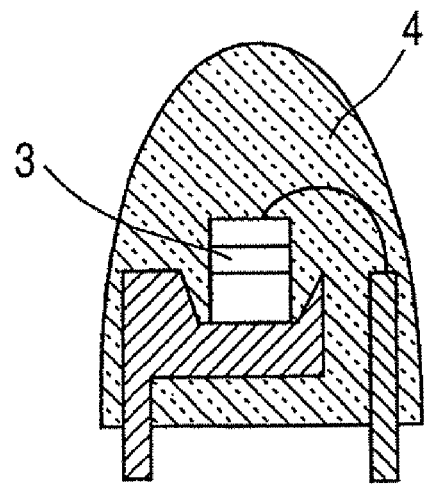
FIG. 22 is a structural diagram of a cannonball-type LED package according to a conventional example.
Figure 23:
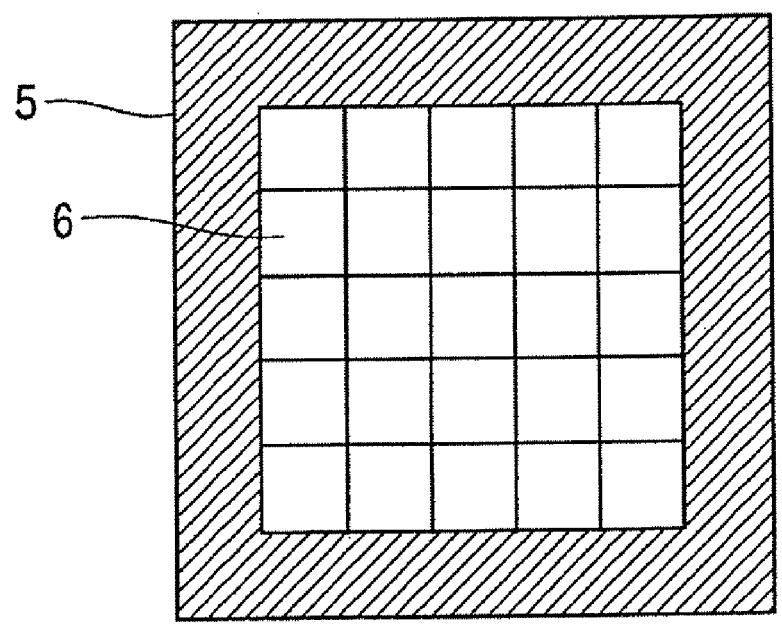
FIG. 23 is a front view of an aperture stop shape according to a conventional example.

FIG. 20 is a structural diagram of a block circuit for performing luminance modulation. An image input signal output from an image output apparatus 51 is connected to the image display apparatus 52. The image input signal input to an image signal input unit 53 of the image display apparatus 52 is connected to a control unit 55 through an image processing unit 54. The control unit 55 is connected with an output of a display set unit 56. Further, an output of the control unit 55 is connected to the light source unit 23 and to the liquid crystal panels 29, 30, and 31.

The image display apparatus 52 obtains an image input signal from the image output apparatus 51 through the image signal input unit 53, performs a predetermined image processing in the image processing unit 54 so as to control the liquid crystal panels 29, 30, and 31 and the light source unit 23, and transmits the signal to the control unit 55. The control unit 55 executes ordinary modulation control for the liquid crystal panels 29, 30, and 31 with reference to the contents of display preferences regarding chromaticity, luminance, or the like, and also executes luminance control over the LED light sources 12 in the light source unit 23 in accordance with an input image. The luminance control executed over the LED light sources 12 includes decreasing luminance of the LED light source units 12 in a case of displaying a dark image, and increasing luminance in a case of displaying a bright image.

When a light valve of liquid crystal or the like is used for the light modulation element, it is generally difficult to express a gradation sequence in displaying a dark image of low contrast, due to the extinction rate of liquid crystal. However, when an LED light source is used, which is capable of modulating luminance at high speed, it is possible to express the fine gradation sequence.

Further, the present invention produces a greater advantage as compared with a case of using a conventional drive-type variable aperture, in terms of high speed modulation. In the case of using the conventional drive-type variable aperture, there is produced a time lag between an input of image information and actual modulation. According to the luminance modulation of the second Embodiment, however, the moving images are subjected to high-speed modulation so as to be modulated for each frame.

The aperture shape of the stop or the shape of the certain area on the fold mirror described in this embodiment may include a shape having widths different in a longitudinal direction and in a lateral direction and may include a shape of 180-degree rotational symmetry (two-fold symmetry). Also, correspondingly to the above, the shape of the light emitting area of the light source unit may include a shape having widths different in a longitudinal direction and in a lateral direction and may be a shape of 180-degree rotational symmetry. In addition, the width of the aperture shape in a longitudinal direction (width in the first direction, that is, a larger one of the widths) may optically correspond to the width of the light emitting area in a longitudinal direction (width in the first direction, that is, a larger one of the widths). In this case, the term "width" refers to a width in a vertical direction with respect to an optical axis of the illumination optical system or the projection optical system. Here, 180-degree rotational symmetry (two-fold symmetry) can be rephrased as a shape which can superimpose on itself when rotating by 180 degrees about an axis, a shape which shows the same shape twice during rotating by 360 degrees about an axis, or a shape which is plane symmetry with respect to two planes different from each other.

Also, in this embodiment, the width D1 may correspond to d1, and the width D2 may correspond to d2, and it is not necessary that the width D1 or d1 be in a longitudinal direction or the width D2 or d2 be in a lateral direction. The longitudinal direction and the lateral direction may be interchanged, and the first direction and the second direction may be set such that the widths D1 and d1 are larger than the widths D2 and d2. Naturally, the aperture shape or the shape of the light emitting area may be formed into a shape of rotational asymmetry (360-degree rotational symmetry, one-fold symmetry).

By applying the above-mentioned embodiments to an illumination optical system, it is possible to attain an illumination optical system having a structure simpler than ever which is capable of performing lighting with high efficiency without reducing overall illumination efficiency by merely controlling a shape of a two-dimensional light source including a plurality of solid-state light emitting elements arranged in a longitudinal direction and in a lateral direction. In addition, a display mode can be switched between brightness-priority mode for a bright image and contrast-priority mode for a dark image.

According to the present invention, it is possible to attain a pupil shape which is suitable for an asymmetrically ellipse stop shape, to thereby decrease sensitivity of the off-axial projection optical system to the product deviations and attain aberration correction and size reduction in the projection optical system. Specifically, a stop diameter in a direction parallel to the plane of FIG. 18 is reduced to be smaller than a stop diameter in a direction orthogonal to the paper plane, to thereby decrease sensitivity to the product deviations and attain aberration correction and size reduction of the projection optical system.

Also, a stop diameter (width) in a direction parallel to the paper plane (YZ plane, the first plane) may be set to be smaller than a stop diameter on a plane orthogonal to the paper plane (XZ plane, the second plane). This structure enables to reduce an incident angle distribution onto a separating/combining surface of a separating/combining element such as a dichroic mirror or a polarization beam splitter. In a case where an incident angle onto the separating/combining surface of the separating/combining element falls outside of a rated value, it is possible to reduce deterioration in contrast of the image display apparatus due to an incident angle characteristic related to the light separation/combination. In this case, the term "paper plane" refers to a plane parallel to each of the normal lines of the plurality of image forming elements (liquid crystal panels) or to a plane parallel both to a normal line of a polarization separation plane of the polarization beam splitter and to a normal line of the image forming element. In this case, the stop diameter may be translated as a width of a light source image.

An image of the solid-state light emitting element is imaged twice or more between the light source unit and the projection surface, which enables to attain a projection optical system having a wide field angle without increasing a size of an optical surface, in which intermediate imaging is performed within the projection optical system.

According to the projection-type image display apparatus according to this embodiment, the light modulation element can be uniformly illuminated with sufficient luminance, and it is possible to guide light beam reflecting a shape of arrayed light sources to a stop position of the projection optical system. The illuminance on the projection surface can be adjusted to an arbitrary value while maintaining the illuminance uniform, and also be adjusted in accordance with a stop shape of the projection optical system.

As described above, illuminance optimal to any image information and illuminance corresponding to a stop shape optimal to the projection optical system can be realized by modulating luminance of a two-dimensional light source formed of a plurality of light emitting units. Further, the present invention can also be applied to a structure of an illumination optical system, in which a high-contrast image can be obtained without reducing illumination efficiency.

Also, it is possible to reduce the sensitivity to product deviations, and to attain aberration correction and size reduction in the projection optical system. Further, it is possible to reduce an incident angle distribution onto the separating/combining surface of a separating/combining element such as a dichroic mirror or a polarization beam splitter, and to reduce deterioration in contrast occurring when an incident angle onto the separating/combining surface of the separating/combining element falls out of a rated value.

The image display apparatus according to the present invention is not limited to a front projector described in the embodiments, and also applied to a rear projector.

According to the image display apparatus according to the embodiments described above, it is possible to switch the brightness on the projection surface with a simple structure while reducing unevenness in illuminance on the projection surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-271351, filed Oct. 3, 2006, which is hereby incorporated by reference herein in its entirety.

What is claimed is:

1. An image display apparatus, comprising:
a light modulation element;
an illumination optical system which includes at least one
  light source unit including a plurality of light emitting units two-dimensionally arranged and illuminates the light modulation element; and a projection optical system for enlarging and projecting an image of the light modulation element on a projection surface, wherein:

an image of the plurality of light emitting units is formed at a position corresponding to a stop of the projection optical system;

the stop has an aperture shape of rotational asymmetry or of two-fold symmetry;

illuminance intensity of each of the plurality of light emitting units is independently controllable;

the projection optical system has a plurality of rotationally asymmetric reflecting surfaces bending a reference axis light beam and is an off-axial projection optical system projecting obliquely the reference axis light beam onto the projection surface, where the reference axis light beam being defined as a light beam passing through a center of the stop and a center of the light modulation element; and a shape of the light source unit is a shape of two-fold symmetry having widths different in a first direction and in a second direction and the second direction extends along an off-axial cross section, where the off-axial cross section being defined as a cross section including the reference axis light beam bent on the rotationally asymmetric reflecting surfaces, the first direction being defined as a direction along which a largest width of a light emitting area of the light source unit extends; and the second direction being defined as a direction orthogonal to the first direction.

2. An image display apparatus according to claim 1, wherein the light emitting area of the light source unit and the aperture shape of the stop are in similarity relationship with each other.

3. An image display apparatus according to claim 1, wherein the image of the plurality of light emitting units is imaged twice or more between the light source unit and the projection surface.

4. An image display apparatus according to claim 1, wherein D1/D2 is changed by controlling turning on/off of the plurality of light emitting units, where D1 and D2 represent widths of the light emitting area in the first direction and in the second direction, respectively.

5. An image display apparatus according to claim 1, wherein the image of the light emitting units formed on the stop is a real image.

6. An image display apparatus according to claim 1, wherein the image display apparatus has a first mode in which brightness has a priority and a second mode in which contrast has a priority, and a light emitting area of the light emitting units in the second mode is smaller than a light emitting area of the light emitting units in the first mode.

7. An image display apparatus according to claim 1,
wherein the off-axial projection optical system includes, in order from the illumination optical system to the projected surface, a zoom lens, an mirror and the reflecting surfaces, and wherein the stop is located between the zoom lens and the mirror or between the mirror and the reflecting surface.

8. An image display apparatus according to claim 1, comprising:

a polarization beam splitter that splits the light beam according to a polarization direction of a light modulated by the light modulation element, wherein the light modulation element is a reflective light modulation element, and wherein a cross section parallel to a normal of the reflective light modulation element and a normal of the polarization beam splitter is a cross section parallel to the second direction.

9. An image display apparatus, comprising:

an image signal input unit;

a light modulation element;

a control unit for controlling the light modulation element;

a projection optical system for enlarging and projecting an image of the light modulation element onto a projection surface; and an illumination optical system for illuminating the light modulation element, wherein:

the illumination optical system includes at least one light source unit including a plurality of light emitting units two-dimensionally arranged;

an image of each of the light emitting units is imaged at a position corresponding to a stop of the projection optical system;

the stop has an aperture shape of rotational asymmetry or of two-fold symmetry;

the control unit controls the light modulation element according to an image input signal and independently controls each of illuminance intensities of the plurality of light emitting units;

the projection optical system has a plurality of rotationally asymmetric reflecting surfaces bending a reference axis light beam and is an off-axial projection optical system projecting obliquely the reference axis light beam onto the projection surface, where the reference axis light beam being defined as a light beam passing through a center of the stop and a center of the light modulation element; and a shape of the light source unit is a shape of two-fold symmetry having widths different in a first direction and in a second direction and the second direction extends along an off-axial cross section, where the off-axial cross section being defined as a cross section including the reference axis light beam bent on the rotationally asymmetric reflecting surfaces; the first direction being defined as a direction along which a largest width of a light emitting area of the light source unit extends; and the second direction being defined as a direction orthogonal to the first direction.

* * * * *